(12) United States Patent
Hallet et al.

(10) Patent No.: US 11,803,674 B2
(45) Date of Patent: Oct. 31, 2023

(54) DUAL MODE POST PROCESSING

(71) Applicant: Autodesk, Inc., San Francisco, CA (US)

(72) Inventors: Justin Nicholas Hallet, Victoria (AU); Nandakumar Santhanam, Ithaca, NY (US); Jerran Schmidt, Victoria (AU)

(73) Assignee: AUTODESK, INC., San Francisco, CA (US)

( * ) Notice: Subject to any disclaimer, the term of this patent is extended or adjusted under 35 U.S.C. 154(b) by 341 days.

(21) Appl. No.: 16/687,379

(22) Filed: Nov. 18, 2019

(65) Prior Publication Data

US 2021/0150000 A1    May 20, 2021

(51) Int. Cl.
*G06F 30/20*    (2020.01)
*G06F 111/02*   (2020.01)

(52) U.S. Cl.
CPC .......... *G06F 30/20* (2020.01); *G06F 2111/02* (2020.01)

(58) Field of Classification Search
CPC .......... G06F 30/10; G06F 30/17; G06F 30/20; G06F 2111/02
See application file for complete search history.

(56) References Cited

U.S. PATENT DOCUMENTS

| | | | |
|---|---|---|---|
| 6,831,642 B2 * | 12/2004 | Mech ...................... | G06T 17/10 345/420 |
| 9,152,740 B1 | 10/2015 | Brennan et al. | |
| 9,934,602 B2 * | 4/2018 | O'Leary ................. | G06T 19/20 |
| 10,347,040 B2 * | 7/2019 | Boulkenafed ........... | G06T 19/20 |
| 11,436,800 B2 * | 9/2022 | Perry ....................... | G06T 17/20 |
| 2009/0079736 A1 * | 3/2009 | Nakao ..................... | G06T 19/20 345/424 |
| 2012/0054261 A1 * | 3/2012 | Evans ...................... | G06F 9/54 709/203 |
| 2012/0330620 A1 | 12/2012 | Sullivan et al. | |
| 2014/0184602 A1 * | 7/2014 | Tuffreau ................. | G06T 9/004 345/427 |

(Continued)

OTHER PUBLICATIONS

Westermann, Rüdiger, and Thomas Ertl. "Efficiently using graphics hardware in volume rendering applications." In Proceedings of the 25th annual conference on Computer graphics and interactive techniques, pp. 169-177. 1998 (Year: 1998).*

(Continued)

*Primary Examiner* — Jay Hann
(74) *Attorney, Agent, or Firm* — Gates & Cooper LLP

(57) ABSTRACT

A method, apparatus, and system provide the ability to conduct a dynamic simulation in a computer-aided design (CAD) application. A CAD model is acquired on a server. On the server, a proxy object is created for the CAD model. The proxy object is a voxel-based representation of the CAD model and fully encompasses a simulation mesh of the CAD model. The proxy object is transmitted to the client. The transmitted proxy object includes extents of a voxel domain, of the voxel-based representation, in three (3) directions, minimum and maximum coordinates in each of the three directions, and a number of voxel divisions in the three directions. the proxy object is processed on the client and enables dynamic interactive rendering operations. The simulation mesh is processed on the server and the proxy object on the client is replaced with a real polygonal rendering from the simulation mesh.

10 Claims, 5 Drawing Sheets

(56) References Cited

U.S. PATENT DOCUMENTS

| | | | |
|---|---|---|---|
| 2014/0229865 A1* | 8/2014 | Da Costa | G06Q 10/101 715/757 |
| 2020/0043214 A1* | 2/2020 | Velevski | H04N 1/00244 |

OTHER PUBLICATIONS

Engel, Klaus, Peter Hastreiter, Bernd Tomandl, K. Eberhardt, and Thomas Ertl. "Combining local and remote visualization techniques for interactive volume rendering in medical applications." In Proceedings Visualization 2000. VIS 2000 (Cat. No. 00CH37145), pp. 449-452. IEEE, 2000 (Year: 2000).*

Engel, Klaus, Rüdiger Westermann, and Thomas Ertl. "Isosurface extraction techniques for web-based volume visualization." In Proceedings Visualization'99 (Cat. No. 99CB37067), pp. 139-519. IEEE, 1999 (Year: 1999).*

Grosso, Roberto, and Thomas Ertl. "Progressive Iso-Surface Extraction from Hierarchical 3D Meshes." In Computer Graphics Forum, vol. 17, No. 3, pp. 125-135. Oxford, UK and Boston, USA: Blackwell Publishers Ltd, 1998 (Year: 1998).*

Rezk-Salama, Christof, Klaus Engel, Michael Bauer, Günther Greiner, and Thomas Ertl. "Interactive volume on standard pc graphics hardware using multi-textures and multi-stage rasterization." In Proceedings of the ACM SIGGRAPH/Eurographics workshop on Graphics hardware, pp. 109-118. 2000 (Year: 2000).*

Usher, Will, and Valerio Pascucci. "Interactive Visualization of Terascale Data in the Browser: Factor Fiction?." In 2020 IEEE 10th Symposium on Large Data Analysis and Visualization (LDAV), pp. 27-36. IEEE, 2020 (Year: 2020).*

Westermann, Rüdiger, Leif Kobbelt, and Thomas Ertl. "Real-time exploration of regular volume data by adaptive reconstruction of isosurfaces." The Visual Computer 15, No. 2 (1999): 100-111 (Year: 1999).*

Mwalongo, Finian. "Interactive web-based visualization", Dissertation, Universitat Stuttgart, (2018). 148 pages (Year: 2018).*

Wang, Q.-H., J-R. Li, and H-Q. Gong. "A CAD-linked virtual assembly environment." International Journal of Production Research 44, No. 3 (2006): 467-486 (Year: 2006).*

Seth, Abhishek, Hai-Jun Su, and Judy M. Vance. "A desktop networked haptic VR interface for mechanical assembly." In ASME International Mechanical Engineering Congress and Exposition, vol. 42142, pp. 173-180. 2005 (Year: 2005).*

Dyken, C., et al. "A Framework for OpenGL Client-Server Rendering" IEEE 4th Int'l Conf. on Cloud Computing Technology & Science, pp. 729-734 (2012) (Year: 2012).*

Wang, Q., et al. "Live Parametric Design Modifications in CAD-linked Virtual Environment" Int'l J. Adv. Manuf. Technol., vol. 50, pp. 859-869 (2010) (Year: 2010).*

Wang, Q., & Li, J. "Interactive visualization of complex dynamic virtual environments for industrial assemblies" Computers in Industry, vol. 57, pp. 366-377 (2006) (Year: 2006).*

PCT International Search Report & Written Opinion dated Feb. 3, 2021 for PCT Application No. PCT/US20/58737.

Extended European Search Report dated Dec. 5, 2022 for European Patent Application No. 20890822.8.

Fruhstuck, A., "Decoupling Object Manipulation from Rendering in a Thin Client Visualization System", Diploma Thesis, Faculty of Infomatics, Technische Universitat Wien, Sep. 2015, pp. 1-109.

* cited by examiner

DUAL MODE POST PROCESSING

BACKGROUND OF THE INVENTION

1. Field of the Invention

The present invention relates generally to engineering simulations, and in particular, to a system, method, apparatus, and article of manufacture for dynamically performing engineering simulations in dual modes—on a client and on a server based cloud system.

2. Description of the Related Art

Developments in network/cloud computing infrastructure has enabled engineering processing to move to the cloud. For example, engineering simulations, three-dimensional (3D) computer-aided design (CAD) processing, computer-aided modeling (CAM) processing, and computer-aided engineering (CAE) processing may be performed on the cloud by multiple computers. Once the processing is complete, the results are often downloaded to a local client machine for display. However, the processing/simulation may generate a large amount of data (e.g., gigabytes), and the downloading of such data (which may be required for rendering) is inefficient, and may result in a bottleneck during the download/transfer process. Accordingly, what is needed is the ability to perform simulation/processing on the cloud while also dynamically visualizing the simulation/processing results without transferring the results. To better understand these problems, a description of prior art simulation/processing may be useful.

Various frameworks for the modeling and simulation of cloud computing infrastructures and services have evolved (e.g., the CLOUDSIM framework). As the cost of actually deploying a modeling simulation system on a cloud may be expensive, cloud computing simulation tools enable the evaluation of a cloud infrastructure and resources under varying load and pricing distributions before incurring actual costs. Cloud computing simulation evaluation systems (as well as cloud computing simulation systems themselves) that have emerged include "zero client" based technology. A zero client, also known as an ultrathin client, is a server-based computing model in which the end-user's computing device has no local storage. A zero client may be contrasted with a thin client, which retains the operating system and each device's specific configuration settings in flash memory. Such zero-client based systems usually perform two tasks: (1) solve and generate result files on the cloud; and (2) perform post-processing that provides results to a client for display/viewing.

For the first task, simulations may be solved and result files may be generated on the cloud. During the second task, a post-processing service of some kind sits on the cloud. The post-processing service's job is to take the simulation results, process them, and serve them up to the client as polygon (or triangle) streams that are displayed on the client side (e.g., using WebGL [Web Graphics Library]—an application programming interface for rendering interactive 3D and 2D graphics within any compatible web browser without the use of plug-ins). One example of such an operation is the server taking volumetric data, creating a slice plane in response to a user request (from the client-side browser), generating the polygons and attribute information needed, and serving this up to the client side for rendering (e.g., via WebGL which uses a graphics processing unit [GPU]).

The problem with the two task based approach is the client→server→client latency for a roundtrip operation creates a lot of friction in dynamic operations. Once again, an example is moving a slice plane dynamically. Each move requires a client-server roundtrip with associated latency. The latency makes the operation quite unpleasant to work with even if the bandwidth is high. In particular, in the slice plane operation, if there is volumetric data in a model (on the server-side), the traditional approach would require the volumetric data to be converted into polygonal data and then transmitted to the client. Accordingly, if the client desires to move a slice plane dynamically, a "move" message is sent from the client to the server, the server process the volumetric data, moves the slice plane to the new location, determines intersections for the volumetric data, extracts the polygonal slices, and then sends over the polygonal data to the client that renders it. Thus, such actions include a round-trip operation and latencies during the processing.

In view of the above, what is needed is the capability to dynamically process and view modeling operations on a client, in a cloud-based simulation/implementation, without latency delays.

SUMMARY OF THE INVENTION

Embodiments of the invention create a "dual-mode" system that sends a very compact, voxel-based "proxy" model from the server to the client at the onset of dynamic operations. Then, dynamic operations are performed on the client-side itself, using this proxy voxel model. Processing continues on the server that sends the real data to the proxy, where the real data replaces the proxy data seamlessly.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
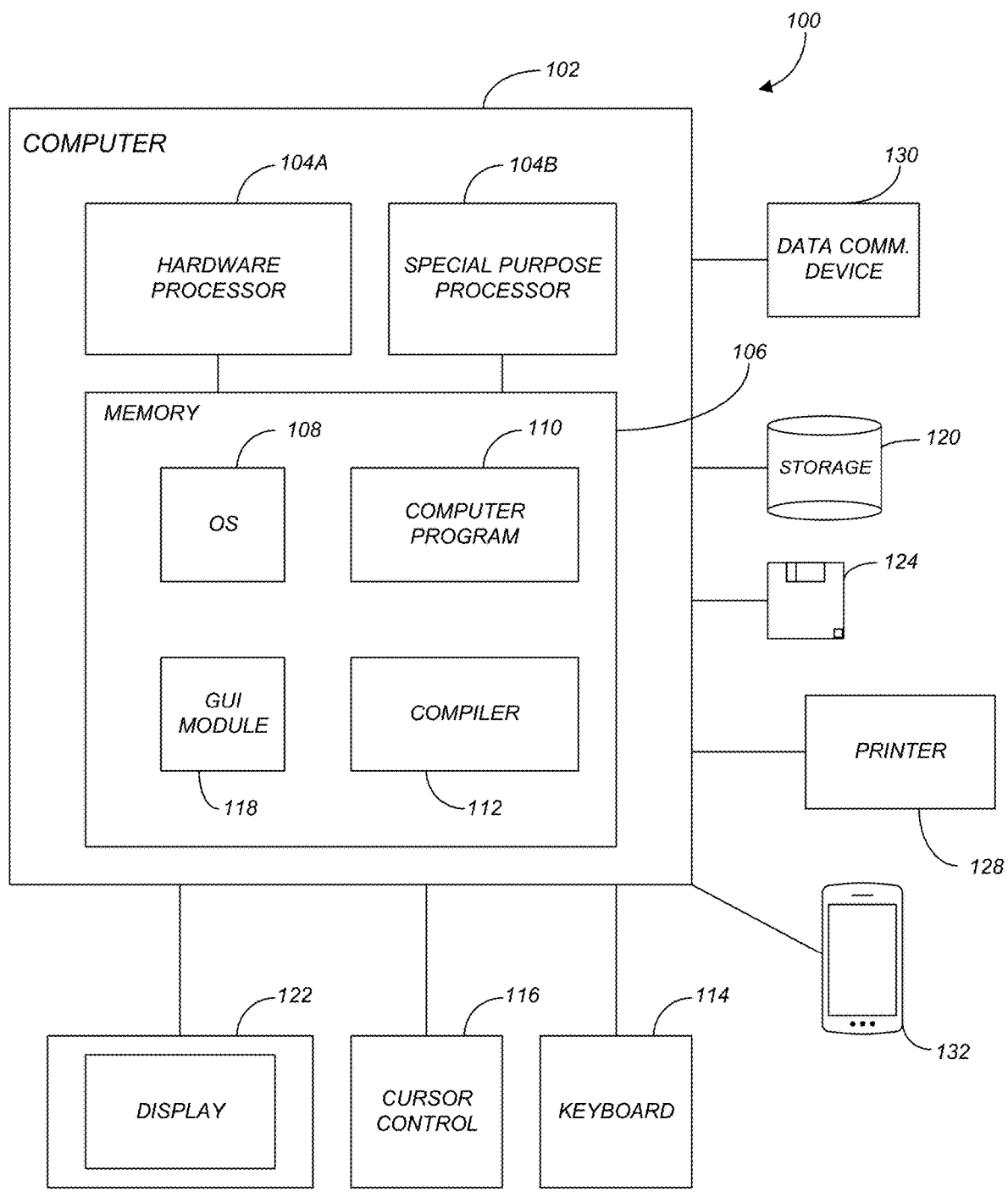
FIG. 1 is an exemplary hardware and software environment used to implement one or more embodiments of the invention.

FIG. 1 is an exemplary hardware and software environment 100 (referred to as a computer-implemented system and/or computer-implemented method) used to implement one or more embodiments of the invention. The hardware and software environment includes a computer 102 and may include peripherals. Computer 102 may be a user/client computer, server computer, or may be a database computer. The computer 102 comprises a hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, IPOD, NOOK, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the hardware processor 104A performing instructions defined by the computer program 110 (e.g., a computer-aided design [CAD] application) under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC). In one or more embodiments special purpose processor 104B may be a graphics processing unit (GPU) that is a specialized electronic circuit designed to rapidly manipulate and alter memory 106 to accelerate the creation of images in a frame buffer intended for output to a display device 122.

The computer 102 may also implement a compiler 112 that allows an application or computer program 110 written in a programming language such as C, C++, Assembly, SQL, PYTHON, PROLOG, MATLAB, RUBY, RAILS, HASKELL, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
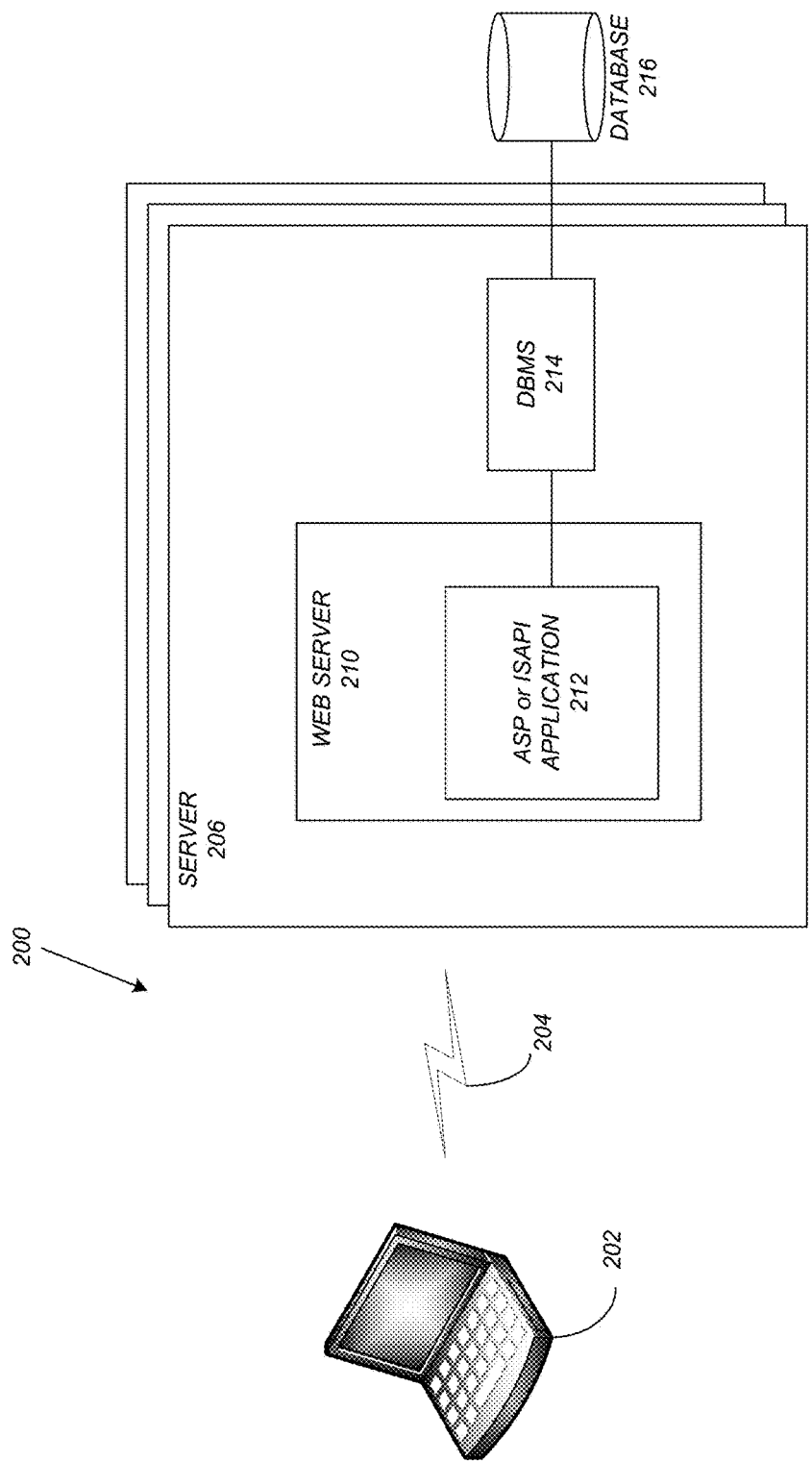
FIG. 2 schematically illustrates a typical distributed/cloud-based computer system using a network to connect client computers to server computers in accordance with one or more embodiments of the invention.

FIG. 2 schematically illustrates a typical distributed/cloud-based computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Further, in a cloud-based computing system, resources (e.g., storage, processors, applications, memory, infrastructure, etc.) in clients 202 and server computers 206 may be shared by clients 202, server computers 206, and users across one or more networks. Resources may be shared by multiple users and can be dynamically reallocated per demand. In this regard, cloud computing may be referred to as a model for enabling access to a shared pool of configurable computing resources.

Clients 202 may execute a client application or web browser and communicate with server computers 206 executing web servers 210. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 202 may be downloaded from server computer 206 to client computers 202 and installed as a plug-in or ACTIVEX control of a web browser. Accordingly, clients 202 may utilize ACTIVEX components/component object model (COM) or distributed COM (DCOM) components to provide a user interface on a display of client 202. The web server 210 is typically a program such as MICROSOFT'S INTERNET INFORMATION SERVER.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S TRANSACTION SERVER (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices (or zero client devices) with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206. Embodiments of the invention are implemented as a software/CAD application on a client 202 or server computer 206. Further, as described above, the client 202 or server computer 206 may comprise a thin client device or a portable device that has a multi-touch-based display.

Software Embodiment Overview

Embodiments of the invention are implemented as a software application on a client 202 or server computers 206. Further, as described above, the client 202 or server computers 206 may comprise thin client devices, zero client devices, or portable devices that have multi-touch-based displays.

As described above, embodiments of the invention provide a "dual-mode" system that sends a very compact, voxel-based "proxy" model from the server 206 to the client 202 at the onset of dynamic operations. Then, dynamic operations are performed on the client-side itself, using this proxy voxel model. Such a system allows the performance of operations with close to zero latency and also in a manner independent of the model size (the voxel proxy enables this). The proxy model thus generates dynamic previews of the result data with minimal latency. When the real data is received from the server side 206, the client 202 replaces the preview data seamlessly. This allows embodiments of the invention to support high fidelity post-processing of results coupled with dynamic previews with minimal latency.

On the client-side 202, operations are accelerated by the use of a GPU 104B when extracting visual elements from the proxy model. Such extraction is important to ensure smooth performance on "zero client" post-processing systems that use the JAVASCRIPT language/script for the user interface implementation.

Client-server latency is a key issue that CAE vendors need to overcome as they transition from their traditional thick/thin client implementations and move to the cloud. Hence, the solution of embodiments of the invention covers important ground that is critical for interactive application performance as the shift to the cloud and zero-client CAE/simulation progresses.

Software Embodiment Details

With CAD/CAE models, simulations are frequently used to determine how the models will react in certain conditions. Various equations (e.g., partial differential equations) may be used to model the physics and solutions. Such equations may be determined using a mesh of the model space in polytopes (e.g., segments [1D], polygons [2D], polyhedral [3D], etc.) that are referred to as elements. In this regard, a mesh may be generated by computational engineers to obtain predictions on complex geometries.

To prepare the mesh, a model may be pre-processed to determine what/how features are loaded and the inputs that may affect a simulation. For example, a geometry source (e.g., from the model) may be used to prepare geometry for a simulation including segmentation healing (specifying details for the boundary representation to properly determine the interior and exterior of the areas/volumes), de-featuring (i.e., removing excessive details not required for the simulation), etc. Element sizes and types are selected, and meshing methods are used to create the mesh that may consist of a polytopal approximation of the model geometry. Such meshing methods may tessellate the prepared geometry. The mesh may then be further refined. Examples of the mesh generation may include adaptive meshing (to produce a mesh of non-uniform size/shape such as though isotropic meshing and/or anisotropic meshing), Delaunay tessellation (to produce triangles where the interior of each triangle does not contain any point), b-rep tessellation (that generates triangles layer by layer starting from the boundary and finishing in the inner part of the area/volume), overlay grid meshing (that cuts an adapted Cartesian mesh with an input boundary representation), etc.

The meshing and solving process of a simulation further includes post-processing/visualization where the mesh is visualized in various different forms. This post-processing visualization is a primary focus of many users that is processor and time intensive. For example, the meshing/solve process may be initialized before a user leaves work for the evening so that it can be completed during the night. Further, as described above, such meshing/solving may be performed in the cloud but results in significant latency issues.

To overcome the problems of the prior art, embodiments of the invention utilize a voxel based proxy model on the client side 202. The voxel based proxy model is an extremely simplified representation of the server side data that enables the performance of dynamic client operations without requiring a round-trip operation. Further, post processing may also be performed on the server side 206 such that the post processing is performed on both the client 202 and server 206, i.e., a dual-mode post processing system. As used herein, post processing is intended to describe a visual representation of physical data (e.g., temperature or stresses) that arises from a computation/simulation, wherein the intent is to visualize such a visual representation on a 3D/CAD model. Such a visualization may be a surface view of the model (e.g., an isosurface view of a model to determine surface temperatures of various parts). Alternatively, the visualization may be an interior view of the model (e.g., a slice of the model [e.g., a slice plane] to view interior attributes) (e.g., a velocity profile of a liquid moving through a model such as water through a faucet).

In view of the above, while the prior art may utilize a large expensive mesh on a volumetric server (with each element having four (4) vertices/nodes, and the use/manipulation of slices/slice planes), embodiments of the invention utilize voxel data that is a much more compact and different representation of the model itself. In this regard, embodiments of the invention are not beginning on the client with high-density data but with controllable resolution elements that may be optimally processed using a GPU (instead of server-side rendering). The various technology enablers that enable such a dual-mode system will be described in detail below.

Proxy Object Creation

To support dynamic operations with minimal latency, a proxy object is created on the server side 206. This proxy object does not use the original mesh from a simulation mesh/solver stack. Instead, the proxy is a special voxel-based representation that is very compact to transfer from the client to the server and also enables very efficient processing on the client-side. The voxel domain is created to fully encompass the simulation mesh. Thereafter, the result from the simulation is mapped onto the voxel mesh to determine vertex values from the quantity being visualized.

More specifically, the proxy object is a representation of the simulation mesh as a uniform or non-uniform grid. Each element in the proxy object contains a value (scalar or vector) for each set of results in the simulation mesh. For a given result set, the value of a given element in the proxy object is determined by establishing the spatial weights of the center of the element relative to the primitive(s) (triangles, tetrahedrons, hexahedrons) in the simulation mesh that it is contained within. These weights are used to interpolate the values at the vertices of the simulation mesh primitive and derive a single value for the proxy object element for that given result set. For non-uniform grids, an octree approach is used to nest uniform grids within each other such that for a given element in a grid it contains either a result value or a reference to another grid. The result sets can be combined such that each element in the proxy object contains multiple values or a proxy object can exist for each result set.

Proxy Data Transfer to Client

The proxy voxel data is transmitted to the client side in a very efficient manner. Since it is a voxel object, the "geometry" of the mesh may be transferred just by specifying the extents of the voxel domain in three (3) directions and the (min, max) coordinate in each direction along with the number of voxel divisions in the three directions. The result values are a single array that is compressed very efficiently using (optional) quantization. The proxy voxel data is sent once for each proxy object and does not need to be sent for each result set represented by a proxy object. Table A illustrates an exemplary table/array with 6 voxel divisions utilized in accordance with one or more embodiments of the invention.

TABLE A

|  | x | Y | z |
|---|---|---|---|
| Min | 10.0 | 0.0 | 5.0 |
| Max | 20.0 | 10.0 | 15.0 |
| number of voxel divisions | 6 | 6 | 6 |

Table B illustrates an exemplary table/array with 12 voxel divisions utilized in accordance with one or more embodiments of the invention.

TABLE B

|  | x | Y | z |
|---|---|---|---|
| Min | 10.0 | 0.0 | 5.0 |
| Max | 20.0 | 10.0 | 15.0 |
| number of voxel divisions | 12 | 12 | 12 |

Figure 3B:
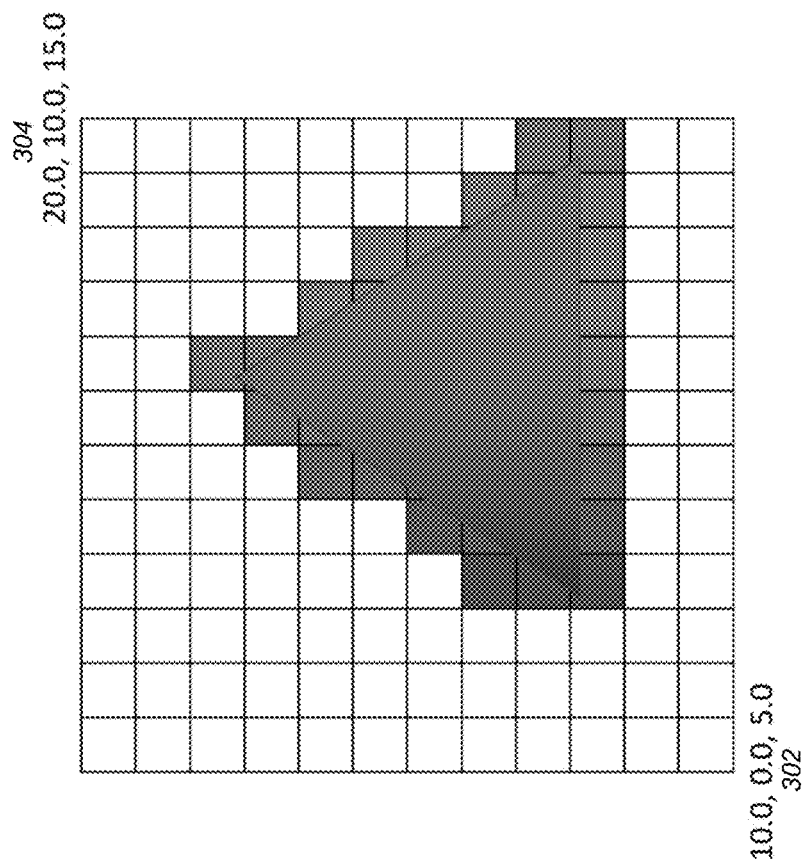
FIGS. 3A and 3B are 2D representation diagrams that are based on the proxy voxel data in accordance with one or more embodiments of the invention.
Figure 3A:
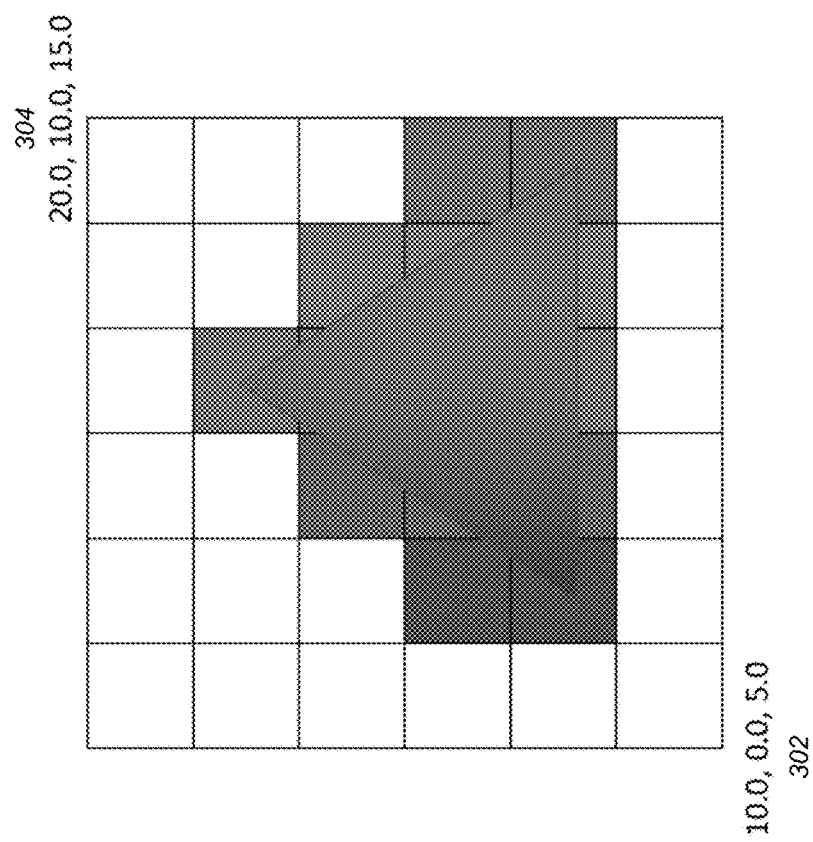

FIGS. 3A and 3B are 2D representation diagrams that are based on the proxy voxel data of Table A and Table B respectively. In both FIG. 3A and FIG. 3B, the lower left corner 302 represents the minimum (x, y, z) coordinates and the upper right corner 304 represents the maximum coordinates. The differences between FIGS. 3A and 3B are the number of voxel divisions per object as reflected in Table A and Table B (6 voxel divisions in FIG. 3A and 12 voxel divisions in FIG. 3B).

Processing of Proxy Voxel Data

On the client side, the proxy voxel data is processed in a very performant way using a GPU API (application programming interface). For example, the client may be a browser using WEBGL or WEBGPU and be utilized. Alternatively, the client may be a native application using DIRECTX, OPENGL, VULKAN, and/or METAL. Specialized methods may be used that enable the proxy voxel mesh to be processed efficiently using GPU API operations to provide results to display for dynamic operations (e.g., moving a slice plane through the model, changing the isosurface contour range dynamically, etc.). The use of the specialized methods is essential to avoid performance degradation associated with the use of an interpreted language (e.g., the JAVASCRIPT language). The preview rendering provides dynamic and fluid behavior during interactive operations like moving the slice plane across the volume. The resultant rendering is adequate to get an accurate feel for the data variation through the interactive changes.

Further to the above, on the client, embodiments of the invention may use the GPU API's definition of a 3D texture to store uniform grids. The vertex shader (of the GPU) is executed for a given point in space and, using the data in Table A, can be transformed into texture space to perform a lookup into the texture and get the value corresponding to the vertex being processed. This value could be a scalar value to represent a point/glyph size/color or a vector value representing a glyph orientation/size/color. Vector values can also be used to generate geometry such as flow lines for a fluid simulation.

Once the preview rendering is finished, the preview is replaced with the real polygonal rendering from the server side as and when it becomes available (the term "dual-mode" post-processing arises from this modality). The dual mode operation includes performing an operation (e.g., edit or modification) to the model on the client using the proxy data as the source with the result displayed to provide the user with immediate feedback. Simultaneously, a request is made to the server to perform the same operation on the simulation mesh, the response to this request is then displayed to the user and the result of the operation performed on the proxy data is discarded. The outcome is that the user gets immediate feedback via the lower resolution proxy mesh (e.g., a mesh that is more pixelated) while the server computes the operation on the simulation mesh.

Further to the above, once the simulation mesh has completed its operation, it may be immediately transferred to the client or there may be a delay. For example, embodiments of the invention may wait for a user to stop moving/adjusting the CAD model before beginning the transfer (e.g., as soon as the user stops moving, the transfer begins). In one or more embodiments, the goal is to transfer the final state and not intermediate slices from the server to the client. In this regard, whenever there is a slight pause in a user's motion, the slice for the affected area of the model may be transferred over but may be thrown away/discarded if the user starts moving again.

In addition, novel approaches for using the GPU instead of the CPU for preview rendering may be conducted. For example, for dynamic isosurfaces when the user sweeps an isosurface through the volume dynamically (e.g., by changing the currently plotted iso-value), each isosurface may be plotted by rendering N parallel rectangles (N may be in the order of 256-1024) that "fill" the voxel volume. A custom fragment shader may then be used that simply looks up the "value at the fragment" based on interpolation into the voxel grid. This allows each rectangle to display a single iso-contour. When a sufficient number of contours are combined, a result is given that is roughly equivalent to a high-fidelity isosurface render using a marching-cube/tetrahedron type approach.

Figure 4B:
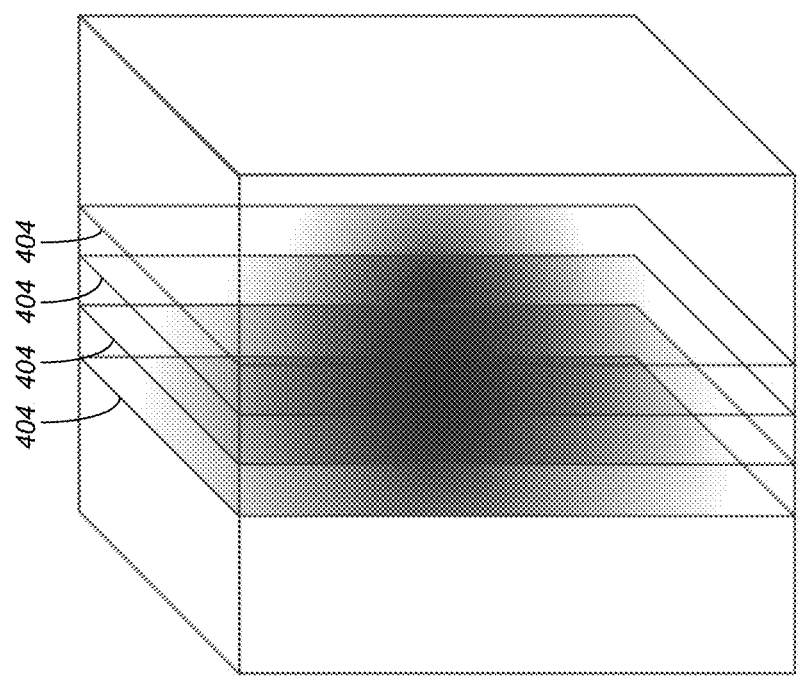
FIGS. 4A and 4B illustrate the use of volumetric slices in accordance with one or more embodiments of the invention.
Figure 4A:
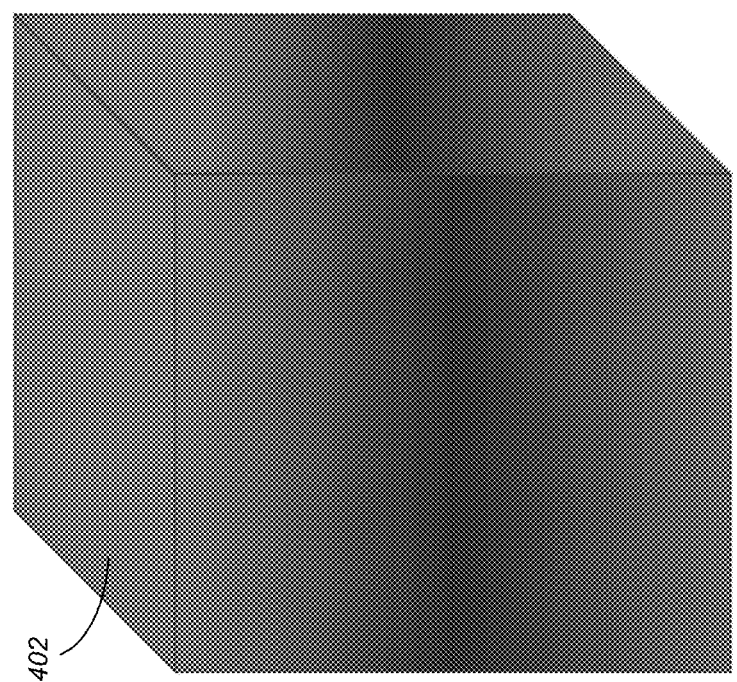

FIGS. 4A and 4B illustrate the use of volumetric slices in accordance with one or more embodiments of the invention. Continuing with the exemplary novel use of the GPU above, a series of rectangles that intersect the volume 402 may be rendered (for a user-specified iso value). In the GPU, discrete fragments are created from continuous primitives. As used herein, the points on a grid may also be called fragments and each fragment corresponds to one pixel in a frame buffer and this corresponds to one pixel of a display screen. Each fragment generated by the GPU is transformed into texture coordinates, and the volume 402 may be sampled using this texture coordinate. The sampled value is compared with the given iso value to determine whether or not to discard the fragment. As illustrated in FIG. 4B, the rectangle "slices" 404 are drawn from back-to-front and blended with one-another to give the appearance of a solid volume as immediate feedback to the user. Simultaneously, a request to the server is made to generate an isosurface using the provided iso value and the simulation mesh. When the isosurface response from the server is received, the isosurface response is displayed and the slices 404 discarded.

Logical Flow

Figure 5:
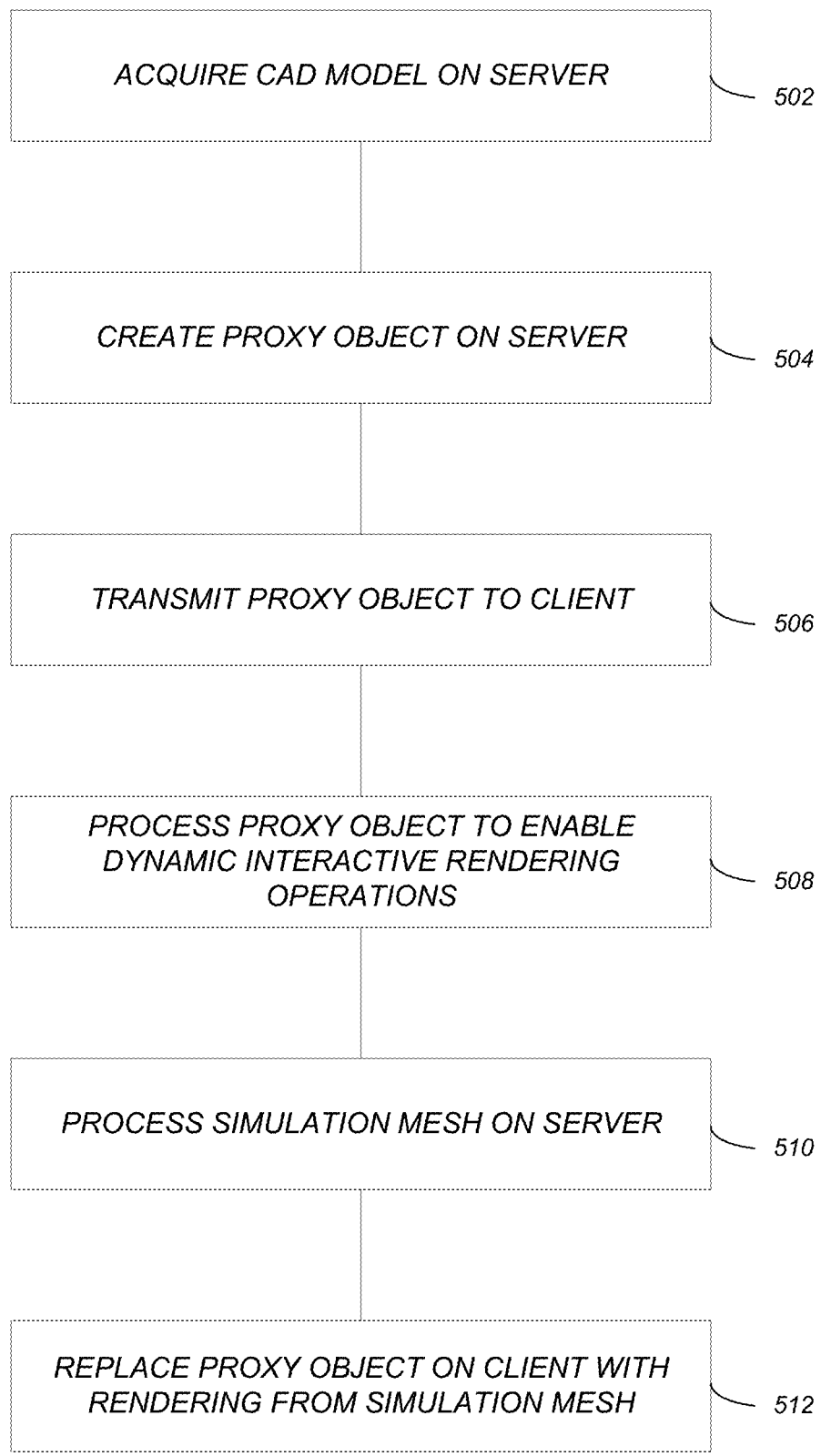
FIG. 5 illustrates the logical flow for conducting a dynamic simulation in a computer-aided design (CAD) in accordance with one or more embodiments of the invention.

FIG. 5 illustrates the logical flow for conducting a dynamic simulation in a computer-aided design (CAD) in accordance with one or more embodiments of the invention.

At step 502, a CAD model is acquired on a server.

At step 504, a proxy object for the CAD model is created on the server. The proxy object is a voxel-based representation of the CAD model, and the proxy object fully encompasses a simulation mesh of the CAD model. The proxy object is a lower resolution compared to that of the simulation mesh.

At step 506, the proxy object is transmitted to the client. The proxy object that is transmitted consists of: (a) extents of a voxel domain, of the voxel-based representation, in three (3) directions; (b) minimum and maximum coordinates in each of the three directions; and (c) a number of voxel divisions in the three directions.

At step 508, the proxy object is processed on the client. The processing enables dynamic interactive rendering operations of the CAD model. In one or more embodiments, the proxy object is processed on the client using a graphics processing unit (GPU). The dynamic interactive rendering operations may include a sweep of an isosurface through the proxy object. In this regard, the processing step 508 (on the client) may include plotting each isosurface by rendering parallel rectangles that fill a volume of a voxel of the voxel-based representation of the proxy object. Thereafter, a value at a fragment may be looked up (via a fragment shader of the GPU) based on interpolation into a grid of the voxel-based representation. Each rectangle of the voxel-based representation displays a single iso-contour. In addition, multiple single iso-contours may be combined.

At step 510, the simulation mesh is processed on the server.

At step 512, upon completion of the processing of the simulation mesh, the proxy object on the client is replaced with a real polygonal rendering from the simulation mesh.

Further to the above, step 502 may further provide that the proxy object is a representation of the simulation mesh. In this regard, each element in the proxy object contains a value for each set of results in the simulation mesh, and for a given set of results in the simulation mesh, the value of a given element in the proxy object is determined by: (a) establishing one or more spatial weights of a center of the given element relative to one or more primitives in the simulation mesh that the given element is contained within; (b) interpolating one or more vertex values at vertices of the one or more primitives, in the simulation mesh, using the one or more spatial weights; and (c) deriving a single value for the given element in the proxy object for a given set of results in the simulation mesh (the single value is based on the one or more vertex values).

Steps 508-512 may also include various additional steps relating to performing a (dynamic) operation on the CAD model. Specifically, an operation on the CAD model is performed on the client using the proxy object as a source. Thereafter, on the client, a result of the operation is dynamically rendered and displayed with dynamic feedback (i.e., based on the proxy object). Simultaneously with performing the operation on the client, a request is sent to the server to perform the same operation on the simulation mesh. A response (to the request) is received on the client from the server. The response is then rendered and displayed on the client instead of the proxy object operation result (i.e., instead of the operation performed on the client based on the proxy object).

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In view of the above, embodiments of the invention provide a dual-mode post processing system for CAE/Sim zero clients. In addition, embodiments use a "proxy" or "stand-in" model that is based on a voxel grid to approximate the full physical model. This voxel model enables very efficient server-client information pass through. Further, embodiments of the invention use a unique GPU-based rendering technique to construct fast previews for dynamic operations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for conducting a dynamic simulation in a computer-aided design (CAD) application, comprising:
   (a) acquiring a CAD model on a server;
   (b) creating, on the server, a proxy object for the CAD model, wherein the proxy object comprises a voxel-based representation of the CAD model, and wherein the proxy object fully encompasses a simulation mesh of the CAD model;
   (c) transmitting the proxy object to the client, wherein the proxy object that is transmitted comprises:
      (i) extents of a voxel domain, of the voxel-based representation, in three (3) directions;
      (ii) minimum and maximum coordinates in each of the three directions; and
      (iii) a number of voxel divisions in the three directions;
   (d) processing, on the client, the proxy object, wherein:
      (i) the processing enables dynamic interactive rendering operations of the dynamic simulation performed using the proxy object as source data;
      (ii) the dynamic simulation comprises an engineering simulation that determines how the CAD model will react in certain conditions;
      (iii) in the dynamic simulation, one or more equations model physics and solutions that are applied to the CAD model;
      (iv) the one or more equations are evaluated using the proxy object;
      (v) the processing comprises performing, on the client, an operation using the proxy object as a source representation of the CAD model;
      (vi) the processing dynamically renders and displays, with dynamic feedback, based on the proxy object, a client result of the operation on the client; and
      (vii) simultaneously with performing the operation on the client, the server is requested to perform the same operation on the simulation mesh;
   (e) performing the dynamic simulation on the CAD model on the server, wherein:
      (i) performing the dynamic simulation on the CAD model on the server comprises generating the simulation mesh based on the CAD model;
      (ii) the simulation mesh comprises a polytopal approximation of a geometry of the CAD model;
      (iii) processing the simulation mesh; and
      (iv) the one or more equations are evaluated on the server using the simulation mesh; and
   (f) upon completion of the processing of the simulation mesh on the server:
      (i) receiving, on the client, a server response, to the processing of the simulation mesh, from the server; and
      (ii) displaying and rendering the server response on the client instead of the client result of the operation performed on the client based on the proxy object, wherein the displaying and rendering comprises replacing the proxy object on the client with a real polygonal rendering from the simulation mesh, wherein the real polygonal rendering comprises a visual representation of the dynamic simulation on the CAD model.

2. The computer-implemented method of claim 1, wherein:
   the proxy object comprises a representation of the simulation mesh;
   each element in the proxy object contains a value for each set of results in the simulation mesh;
   for a given set of results in the simulation mesh, the value of a given element in the proxy object is determined by:
      establishing one or more spatial weights of a center of the given element relative to one or more primitives in the simulation mesh that the given element is contained within;

interpolating one or more vertex values at vertices of the one or more primitives, in the simulation mesh, using the one or more spatial weights; and deriving a single value for the given element in the proxy object for a given set of results in the simulation mesh, wherein the single value is based on the one or more vertex values.

3. The computer-implemented method of claim 1, wherein the proxy object is lower fidelity compared to that of the simulation mesh.

4. The computer-implemented method of claim 1, wherein the proxy object is processed on the client using a graphics processing unit (GPU).

5. The computer-implemented method of claim 4, wherein:

the dynamic interactive rendering operations comprise a sweep of an isosurface through the proxy object;

the processing on the client comprises plotting the isosurface by rendering parallel rectangles that fill a volume of a voxel of the voxel-based representation of the proxy object;

looking up, via a fragment shader of the GPU, a value at a fragment, based on interpolation into a grid of the voxel-based representation;

each rectangle of the voxel-based representation displays a single iso-contour; and combining multiple single iso-contours.

6. A computer-implemented system for conducting a dynamic simulation in a computer-aided design (CAD) application, comprising:

(a) a client computer having a client memory;
(b) a server computer having a server memory;
(c) a client processor executing on the client computer;
(d) a server processor executing on the server computer;
(e) the server memory storing a server set of instructions, wherein the server set of instructions, when executed by the server processor cause the server processor to perform operations comprising:
  (i) acquiring a CAD model on the server computer;
  (ii) creating, on the server computer, a proxy object for the CAD model, wherein the proxy object comprises a voxel-based representation of the CAD model, and wherein the proxy object fully encompasses a simulation mesh of the CAD model;
  (iii) transmitting the proxy object to the client computer, wherein the proxy object that is transmitted comprises:
    (1) extents of a voxel domain, of the voxel-based representation, in three (3) directions;
    (2) minimum and maximum coordinates in each of the three directions; and
    (3) a number of voxel divisions in the three directions;
  (iv) performing the dynamic simulation on the CAD model on the server, wherein:
    (1) the dynamic simulation comprises generating the simulation mesh based on the CAD model;
    (2) the simulation mesh comprises a polytopal approximation of a geometry of the CAD model;
    (3) processing the simulation mesh on the CAD model on the server;
    (4) the dynamic simulation comprises an engineering simulation that determines how the CAD model will react in certain conditions;
    (5) in the dynamic simulation, one or more equations model physics and solutions that are applied to the CAD model; and
    (6) the one or more equations are evaluated on the server using the simulation mesh;
(f) the client memory storing a client set of instructions, wherein the client set of instructions, when executed by the client processor cause the client processor to perform an operations comprising:
  (i) processing, on the client computer, the operation using the proxy object as a source representation of the CAD model, wherein the processing enables dynamic interactive rendering and displaying with dynamic feedback, based on the proxy object, a client result of the operation on the client computer; and
  (ii) simultaneously with performing the operation on the client, requesting the server computer to perform the same operation on the simulation; and
  (iv) upon completion of processing the simulation mesh on the server computer:
    (1) receiving, on the client computer, a server response, to the processing of the simulation mesh, from the server; and
    (2) displaying and rendering the server response on the client instead of the client result of the operation, wherein the displaying and rendering comprises replacing the proxy object on the client computer with a real polygonal rendering from the simulation mesh, wherein the real polygonal rendering comprises a visual representation of the dynamic simulation on the CAD model.

7. The computer-implemented system of claim 6, wherein:

the proxy object comprises a representation of the simulation mesh;

each element in the proxy object contains a value for each set of results in the simulation mesh;

for a given set of results in the simulation mesh, the value of a given element in the proxy object is determined by:
  establishing one or more spatial weights of a center of the given element relative to one or more primitives in the simulation mesh that the given element is contained within;
  interpolating one or more vertex values at vertices of the one or more primitives, in the simulation mesh, using the one or more spatial weights; and
  deriving a single value for the given element in the proxy object for a given set of results in the simulation mesh, wherein the single value is based on the one or more vertex values.

8. The computer-implemented system of claim 6, wherein the proxy object is lower fidelity compared to that of the simulation mesh.

9. The computer-implemented system of claim 6, wherein the proxy object is processed on the client computer using a graphics processing unit (GPU).

10. The computer-implemented system of claim 9, wherein:

the dynamic interactive rendering operations comprise a sweep of an isosurface through the proxy object;

the processing on the client computer comprises plotting the isosurface by rendering parallel rectangles that fill a volume of a voxel of the voxel-based representation of the proxy object;

looking up, via a fragment shader of the GPU, a value at a fragment, based on interpolation into a grid of the voxel-based representation;

each rectangle of the voxel-based representation displays a single iso-contour; and
combining multiple single iso-contours.

\* \* \* \* \*